United States Patent [19]

Lejeune

[11] 4,173,992
[45] Nov. 13, 1979

[54] RADIALLY REINFORCED WHEEL RIMS OF MOLDABLE MATERIAL

[75] Inventor: Daniel Lejeune, Clermont-Ferrand, France

[73] Assignee: Compagnie Generale des Etablissements Michelin, Clermont-Ferrand, France

[21] Appl. No.: 862,862

[22] Filed: Dec. 21, 1977

Related U.S. Application Data

[63] Continuation-in-part of Ser. No. 733,908, Oct. 19, 1976, abandoned, which is a continuation of Ser. No. 557,647, Mar. 12, 1975, abandoned.

[30] Foreign Application Priority Data

Mar. 25, 1974 [FR] France ............................... 74 10201

[51] Int. Cl.² ............................................. B60B 5/02
[52] U.S. Cl. ................................ 152/381.1; 152/410; 301/63 PW; 301/95
[58] Field of Search ................. 301/63 R, 63 PW, 65, 301/95-98, 35 R, 35 SS; 152/381.1, 406, 409, 410, 378 R; 264/277; 164/411, 58, DIG. 14; 156/84, 85

[56] References Cited

U.S. PATENT DOCUMENTS

| 475,305 | 5/1892 | Follett | 301/65 |
| 1,439,037 | 12/1922 | Swain | 301/65 |
| 1,652,511 | 12/1927 | Atwood | 301/35 R |
| 2,813,050 | 11/1957 | Hickson | 9/6 |
| 3,369,843 | 2/1968 | Prew | 301/63 PW |
| 3,917,352 | 11/1975 | Gageby | 301/63 PW |

FOREIGN PATENT DOCUMENTS 1939910 2/1971 Fed. Rep. of Germany ..... 301/63 PW

OTHER PUBLICATIONS

Norbye, J., Popular Science, Oct. 1973, p. 18.

Primary Examiner—Robert J. Spar
Assistant Examiner—H. Grant Skaggs
Attorney, Agent, or Firm—Brumbaugh, Graves, Donohue & Raymond

[57] ABSTRACT

Wheel rims of moldable material for a tire having roundings at least in part connecting the base, bead seat and flange elements of the rim with each other, each of the roundings having a concave face and a convex face, are improved and strengthened against tension strains by at least the rounding of the greatest curvature being provided with a tension-resistant reinforcement embedded in said rounding in the vicinity of the concave face of said rounding, the reinforcement comprising reinforcing elements arranged approximately in radial planes of the rim.

19 Claims, 4 Drawing Figures

RADIALLY REINFORCED WHEEL RIMS OF MOLDABLE MATERIAL

This application is a continuation-in-part application of U.S. Ser. No. 733,908 filed Oct. 19, 1976, which is a continuation application of U.S. Ser. No. 557,647, filed Mar. 12, 1975 (both now abandoned).

The present invention relates to improvements in wheels intended to be equipped with tires. More particularly it relates to wheels made from moldable materials having a relatively low modulus of elasticity.

The advantage of such materials resides in the fact that their density is generally relatively low. This makes it possible to obtain light weight wheels. However, for an equal volume used, materials which have a high modulus of elasticity, such as steel for instance, are definitely superior. They make it possible to obtain very strong wheels, but these wheels are of considerable weight and are obtained by means of complicated methods of manufacture. Nevertheless, by providing the wheels of moldable materials of the type described above with suitable reinforcements it is possible to obtain wheels which are both light and strong.

The difficulty in connection with wheels of the type covered by the present invention consists of deriving the greatest benefit from the reinforcing materials forming the reinforcement. Materials which are both light and have outstanding mechanical properties are preferably selected. A small amount of moldable material and of reinforcing material can thus be used simultaneously.

More specifically, the difficulty resides, on the one hand, in arranging the components of the reinforcement in the regions which are most strained by the forces which act on the wheels. On the other hand, it is advisable to use the reinforcing material or materials having the best performance with respect to the quantity of the material or materials used.

Thus, the object of the present invention is to reinforce wheel rims of moldable material for a tire against tension strains which tend to flatten, that is to say open, the rim as seen in radial section.

As is known, a rim has as its elements a base with a bead seat and a flange on both sides thereof. In practice, depending on whether some of these elements are removable with respect to the others or not, one encounters two types of rims. A first type of rim comprises a base with respect to which one or more of the side elements, i.e., flanges and seats, are removable. In the second ordinary type of rim, all the elements are physically connected to each other and form a single-piece rim. In both the types of rims described briefly above the elements which are not removable with respect to each other are, when they are not arranged in the extension of each other, connected by means of curved portions referred to as roundings.

It is in these roundings that the maximum strains which tend to flatten the rim are located.

The roundings can be schematically indicated as being physical members included between two circular arcs which are not necessarily concentric but have their curvatures directed in the same direction. These two arcs, i.e., the concave face and the convex face, define the physical thickness of the rim at the location of the roundings. In the physical thickness of the rounding the compression strains appear in the vicinity of the convex face of the rounding and the tension strains appear in the vicinity of the concave face of the rounding. The maximum intensity of these two strains is reached in the immediate vicinity of these faces of the roundings and in the radial direction. At approximately half the distance between the concave face and the convex face of the roundings there is a neutral line along which the strains are nil.

The moldable materials in question have in general a sufficient resistance to compression strains but insufficient resistance to tension strains. The idea which forms the basis of the present invention consists in arranging reinforcing elements which well withstand at least tension strains in the regions of the roundings subjected to the tension strains and more particularly in the regions of the roundings where the said tension strains will be maximum.

Thus the wheel rims of moldable material for a tire in accordance with the invention having roundings at least in part connecting the base, bead seat and flange elements of the rim with each other, each of the roundings have a concave face and a convex face, are characterized by the fact that at least the rounding having the greatest curvature is provided with a tension-resistant reinforcement embedded in said rounding in the vicinity of the concave face of said rounding, the reinforcement comprising reinforcing elements arranged approximately in radial planes of the rim.

The rounding having the greatest curvature is the one which contains locally the smallest radius of curvature.

The molded rims provided by the present invention may be made from a material which is moldable by any known process. The reinforcement or at least a portion thereof is embedded within this material. The modulus of elasticity of the material or materials constituting the reinforcement is greater than the modulus of elasticity of the moldable material constituting the rim of the wheel. Rims of moldable material reinforced in accordance with the invention comprise, for instance, wheels of light metal alloy or synthetic resin with a reinforcement of cables of steel, glass fibers or carbon, etc.

The invention comprises variant embodiments enumerated during the following description, although this enumeration is not to be considered limitative.

Thus one embodiment is an improved reinforced single-piece type wheel rim of moldable material for a tire having as elements of the rim a sunken base (also known as a drop center) with two sidewalls and comprising on one side of said sunken base a first rounding between said sunken base and a sidewall, each sidewall terminating in a second rounding, a bead seat adjacent each second rounding and a flange connected to each bead seat by a third rounding, two at least of the first, second and third roundings having different curvatures, each of the roundings having a concave face and a convex face, wherein the improvement comprises at least the rounding of maximum curvature has a tension-resistant reinforcement embedded in said rounding only in the vicinity of the concave face of said rounding, the reinforcement comprising reinforcing elements arranged solely and approximately in radial planes of the rim.

Another embodiment is an improved reinforced removable flange type wheel rim of moldable material for a tire having as elements of the rim a flat base, a bead seat on each side of the flat base as an extension thereof, a fixed flange connected to one of the bead seats by a first rounding and a removable flange at the other bead seat, said flat base being extended by a bulged portion which is connected to the flat base by a second rounding, said bulged portion having a groove intended to receive a locking ring for the removable flange, each of the roundings having a concave face and a convex face and one of the roundings having a greater curvature than the other, wherein the improvement comprises at least the rounding of greater curvature has a tension-resistant reinforcement embedded in said rounding only in the vicinity of the concave face of said rounding, the reinforcement comprising reinforcing elements arranged solely and approximately in radial planes of the rim.

In order to derive advantage from the strength of the tension-resistant reinforcement embedded in the roundings in accordance with the invention it is advisable to use moldable materials and reinforcement materials which adhere or are made adherent to each other. This adherence can be effected by any means of chemical and/or physical and/or mechanical origin applied to one or more of the materials present.

It may also be advantageous in accordance with the invention to use moldable materials having a satisfactory resistance to compression, such as for instance certain synthetic resins, in combination with reinforcement materials which are less resistant to compression but more resistant to tension, such as for instance glass fibers.

In order to improve the anchoring of the reinforcements in accordance with the invention, one can also extend the said reinforcements into one or the other or both elements of the rim adjacent the roundings which are less acted on by the tension strains. One can also produce a reinforcement which extends continuously through several roundings at the same time or all of them, particularly in the case of a single-piece rim of the second type.

It is also of interest to arrange the reinforcements in accordance with the invention as close as possible to or in the immediate vicinity of the concave face of the rounding, that is to say the regions where the maximum tension strains are located. This can be done by, for instance, arranging the reinforcement parallel to the concave face of the rounding or else tangentially to it. Such an arrangement furthermore affords other advantages. It facilitates the anchoring of the said reinforcements in the mass of the elements of the rim adjacent the roundings. It can also facilitate or simplify the making or putting in place of the reinforcements in accordance with the invention.

Preferably, reinforcing elements of suitable materials in the form of wires, threads, strands, cords or cables are used for forming the reinforcements. One can also use plies or fabrics formed from wires, threads, strands, cords, or cables or else layers of felted materials formed from suitable reinforcement material particules of any shape and dimension and oriented or dispersed at random, these particles being embedded in a matrix compatible, on the one hand, with the reinforcement materials and, on the other hand, with the moldable materials of the rim.

Preferably the rim has a rigid ring in one or in each flange around which ring the reinforcement is anchored.

The drawing which is described below will make it possible readily to understand the invention. This drawing shows certain nonlimitative embodiments of the invention.

Figure 2:
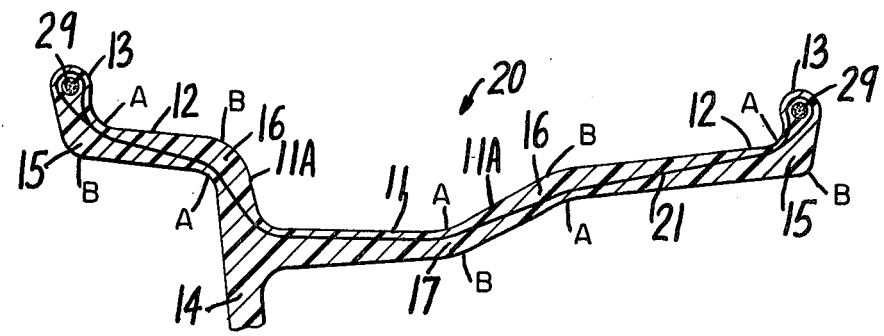
FIG. 2 is a radial sectional view of the same rim comprising a continuous single reinforcement from one flange to the other.
Figure 4:
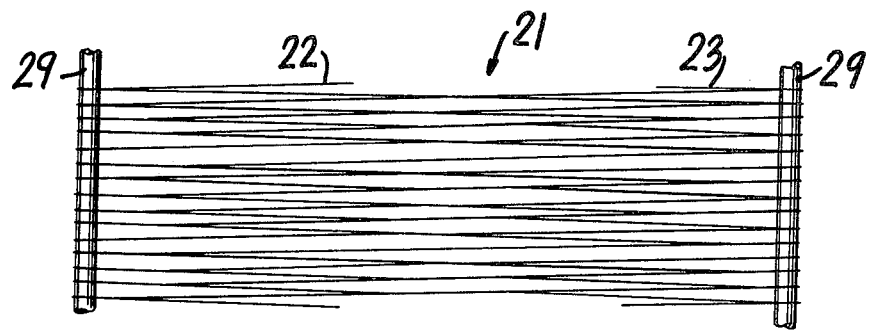

FIG. 4 seen in radial direction, is a sector view of the rim of FIG. 2 with filament form reinforcing elements arranged approximately in radial planes of the rim, i.e, in planes forming a very small angle with the radial planes.

Figure 1:
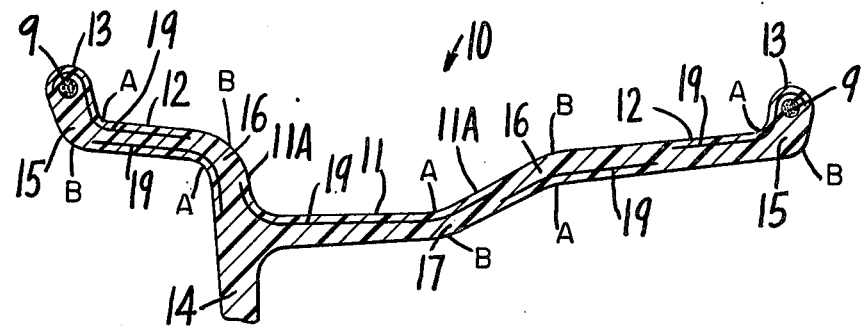
FIG. 1 is a radial sectional view through a single-piece rim having reinforcements in accordance with a preferred embodiment of the invention.

In FIG. 1 there is shown a radial section through a single-piece wheel rim 10 of moldable material. This rim comprises on both sides of the sunken base 11 a seat 12 for the beads of the tire (not shown). Each bead seat 12 is extended towards the outside by a flange 13. This rim is integral with a disk 14 which has been shown in part. As can be seen, the different elements of the rim, namely sunken base 11, bead seats 12, and flanges 13, are connected directly or indirectly to each other by roundings 15, 16. The sunken base 11 furthermore has a rounding 17 between it and one of its two sidewalls 11A, each sidewall 11A terminating in the rounding 16. The roundings 15, 16 and 17 have different curvatures and each has a concave face A and a convex face B. Rounding 15 has the greatest or maximum curvature. In accordance with a preferred embodiment of the invention, reinforcements 19 are embedded in each rounding 15, 16 and 17 in the vicinity of the concave face A of each rounding and are parallel to the concave face A. In order to anchor them, the reinforcements 19 are extended into the elements of the rim 10 which are adjacent the rounding 15, 16 and 17. As to the reinforcements 19 of the roundings 15 which connect the bead seats 12 to the flanges 13, they are extended on the one side into the bead seats 12 while on the other side they are each bent around a rigid ring 9 in a flange 13 which also serves as anchoring for them. The rigid ring 9 furthermore reinforces and imparts increased resistance against impact to the flanges 13.

In the rim 20 of moldable material, a radial section of which is shown in FIG. 2 and a sector shown in radial direction in FIG. 4, the rigid rings 29 serve as support for forming the reinforcement 21. These rigid rings 29 are concentric to the axis of rotation of the rim 20. As can be seen from these figures, the reinforcement 21 is continuous from one flange 13 to the other. The reinforcement 21 is formed of two wire reinforcing elements 22 and 23 wound in opposite directions around rigid rings 29 which are held apart. In accordance with a preferred embodiment of the invention, the wire reinforcing elements 22 and 23 are embedded in each rounding 15, 16 and 17 in the vicinity of the concave face A of each rounding and are tangential to the concave face A. As shown in FIG. 4, these wires 22 and 23 are arranged approximately in radial planes of the rim 20.

Figure 3:
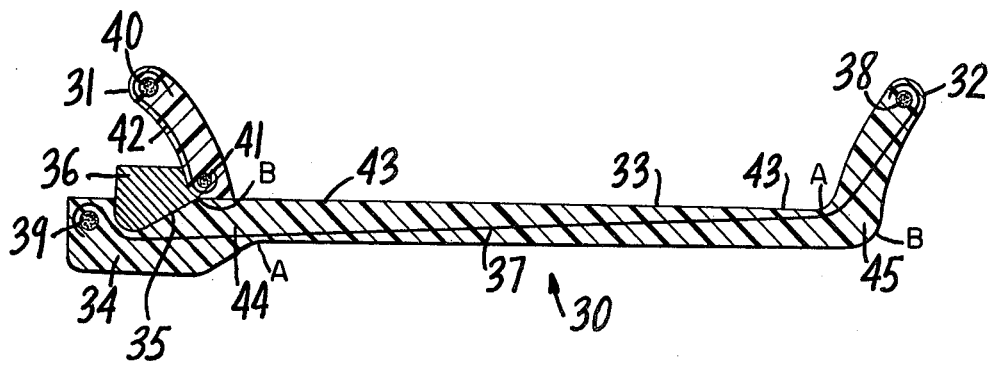
FIG. 3 is a radial sectional view of a rim having a removable flange, comprising a single reinforcement extending from the end of the locking groove of the removable flange to the fixed flange.

FIG. 3 shows a radial section through a rim 30 of moldable material having a removable flange 31, the other flange 32 being fixed. For this purpose, the flat base 33 is extended by a bulged portion 34 provided with a groove 35 intended to receive the locking ring 36 for the removable flange 31. In this embodiment the continuous filament form embedded reinforcement 37 is anchored by turning it around two rigid rings 38 and 39, one located at the end of the fixed flange 32 and the other located in the end portion of the bulged portion 34. The reinforcement 37 in accordance with the invention is in the vicinity of and tangential to the concave face A of the rounding 44 connecting the bulged portion 34 to the flat base 33 and also is in the vicinity of and tangential to the concave face A of the rounding 45 of greater curvature connecting the flat base 33 to the fixed flange 32. The reinforcement 37 comprises reinforcing elements arranged approximately in radial planes of the rim 30 (comparable to those shown in FIG. 4). The removable flange 31 also has two rigid rings 40 and 41 arranged along each edge. The reinforcement 42 of the removable flange 31 is anchored by turning it around the two rigid rings 40 and 41. The wheel rim 30 has a seat 43 for the beads of the tire (not shown) on each side of the flat base 33 as an extension thereof.

What is claimed is:

1. In a reinforced single-piece type wheel rim of moldable material for a tire having as elements of the rim a sunken base with two sidewalls and comprising on one side of said sunken base a first rounding between said sunken base and a sidewall, each sidewall terminating in a second rounding, a bead seat adjacent each second rounding and a flange connected to each bead seat by a third rounding, two at least of the first, second and third roundings having different curvatures, each of the roundings having a concave face and a convex face, the improvement which comprises at least the rounding of maximum curvature has a tension-resistant reinforcement embedded in said rounding only in the vicinity of the concave face of said rounding, the reinforcement comprising reinforcing elements arranged solely and approximately in radial planes of the rim.

2. The reinforced wheel rim defined by claim 1 wherein at least one other of the roundings has a tension-resistant reinforcement embedded in said other rounding only in the vicinity of the concave face of said other rounding, the reinforcement comprising reinforcing elements arranged solely and approximately in radial planes of the rim.

3. The reinforced wheel rim defined by claim 1 wherein each of the roundings has a tension-resistant reinforcement embedded in each rounding only in the vicinity of the concave face of each rounding, the reinforcement comprising reinforcing elements arranged solely and approximately in radial planes of the rim.

4. The reinforced wheel rim defined by claim 1 wherein the moldable material and the reinforcement adhere to each other.

5. The reinforced wheel rim defined by claim 1 wherein the moldable material is resistant to compression and the reinforcement is less resistant to compression but more resistant to tension.

6. The reinforced wheel rim defined by claim 1 wherein the reinforcement is extended into at least one of said elements of the rim which is adjacent the rounding.

7. The reinforced wheel rim defined by claim 1 wherein the reinforcement extends continuously through more than one rounding.

8. The reinforced wheel rim defined by claim 1 wherein each reinforcement is parallel to a concave face.

9. The reinforced wheel rim defined by claim 1 wherein each reinforcement is tangential to a concave face.

10. The reinforced wheel rim defined by claim 1 wherein the rim has a rigid ring in at least one flange around which ring the reinforcement is anchored.

11. In a reinforced removable flange type wheel rim of moldable material for a tire having as elements of the rim a flat base, a bead seat on each side of the flat base as an extension thereof, a fixed flange connected to one of the bead seats by a first rounding and a removable flange at the other bead seat, said flat base being extended by a bulged portion which is connected to the flat base by a second rounding, said bulged portion having a groove intended to receive a locking ring for the removable flange, each of the roundings having a concave face and a convex face and one of the roundings having a greater curvature than the other, the improvement which comprises at least the rounding of greater curvature has a tension resistant reinforcement embedded in said rounding only in the vicinity of the concave face of said rounding, the reinforcement comprising reinforcing elements arranged solely and approximately in radial planes of the rim.

12. The reinforced wheel rim defined by claim 11 wherein the other of the roundings has a tension-resistant reinforcement embedded in said other rounding only in the vicinity of the concave face of said other rounding, the reinforcement comprising reinforcing elements arranged solely and approximately in radial planes of the rim.

13. The reinforced wheel rim defined by claim 11 wherein each of the roundings has a tension-resistant reinforcement embedded in each rounding only in the vicinity of the concave face of each rounding, the reinforcement comprising reinforcing elements arranged solely and approximately in radial planes of the rim.

14. The reinforced wheel rim defined by claim 11 wherein the moldable material and the reinforcement adhere to each other.

15. The reinforced wheel rim defined by claim 11 wherein the moldable material is resistant to compression and the reinforcement is less resistant to compression but more resistant to tension.

16. The reinforced wheel rim defined by claim 11 wherein the reinforcement is extended into at least one of said elements of the rim which is adjacent the rounding.

17. The reinforced wheel rim defined by claim 11 wherein the reinforcement extends continuously through more than one rounding.

18. The reinforced wheel rim defined by claim 11 wherein each reinforcement is tangential to a concave face.

19. The reinforced wheel rim defined by claim 11 wherein the rim has a rigid ring in said fixed flange and a rigid ring in said bulged portion around which rings the reinforcement is anchored.

* * * * *